United States Patent [19]

Bayer et al.

[11] 4,443,929
[45] Apr. 24, 1984

[54] MACHINING CENTER

[76] Inventors: Jack L. Bayer, 2145 E. Pasadina, Phoenix, Ariz. 85016; Walter J. Breitkopf, 6050 E. Wilshire, Scottsdale, Ariz. 85257

[21] Appl. No.: 358,291

[22] Filed: Mar. 15, 1982

[51] Int. Cl.³ .......................................... B23Q 3/157
[52] U.S. Cl. .................................................. 29/568
[58] Field of Search ......................... 29/568; 414/736; 408/42, 139, 140, 47

[56] References Cited

U.S. PATENT DOCUMENTS

| 421,517 | 2/1890 | Richards | 408/133 |
|---|---|---|---|
| 3,191,260 | 6/1965 | Jorgensen | 408/140 X |
| 3,999,769 | 12/1976 | Bayer et al. | 279/82 X |
| 4,237,595 | 12/1980 | Kitamura | 29/568 |
| 4,309,809 | 1/1982 | Yokoe et al. | 29/568 |

Primary Examiner—William R. Briggs
Assistant Examiner—Lawrence Meier
Attorney, Agent, or Firm—Cahill, Sutton & Thomas

[57] ABSTRACT

A machining center of the type incorporating a spindle for driving tools wherein the spindle is movable rectilinearly along the axis of the spindle for engaging tool holders to move tool holders, and tools secured thereto, into an operative position wherein the tools contact a work piece. The rotational speed of the spindle, as well as its rectilinear motion, is controlled by a programmed numerical control center which also controls the bed upon which the work piece is mounted; the bed is movable, at predetermined rates, in the X, Y and Z directions. A positioning means, such as turret or carousel, is positioned beneath the spindle and is used to hold several tool holders, each of which supports tools for use in the machining operation. The tool holders are temporarily secured in the positioning means and are removed therefrom through the operation of the lowering spindle; the tool holders are formed in three sections, the first of which contacts and is driven by the rotating spindle. The second section of the tool holder is held against rotation by an anti-rotation device which operates through a coupling secured at one end to a vertically movable ram and at the other end to the second section of the tool holder. The tool holder also includes a third section that incorporates a tool holding spindle; the first section and the third section of the tool holder are interconnected by a drive coupling that permits significant variations from the conventional spindle rotational velocity and rectilinear motion. Selected drive couplings are provided for three dimensional angular displacement of the tool holding spindle relative to the rotational axis of the spindle on the machine center. Further selection of the drive coupling in the machine tool permits the simultaneous use of multiple tools, the utilization of multiple tools rotating about an axis perpendicular to the axis of the spindle, and rotational velocities of tools in excess of the rotational velocity of the driving spindle.

23 Claims, 11 Drawing Figures

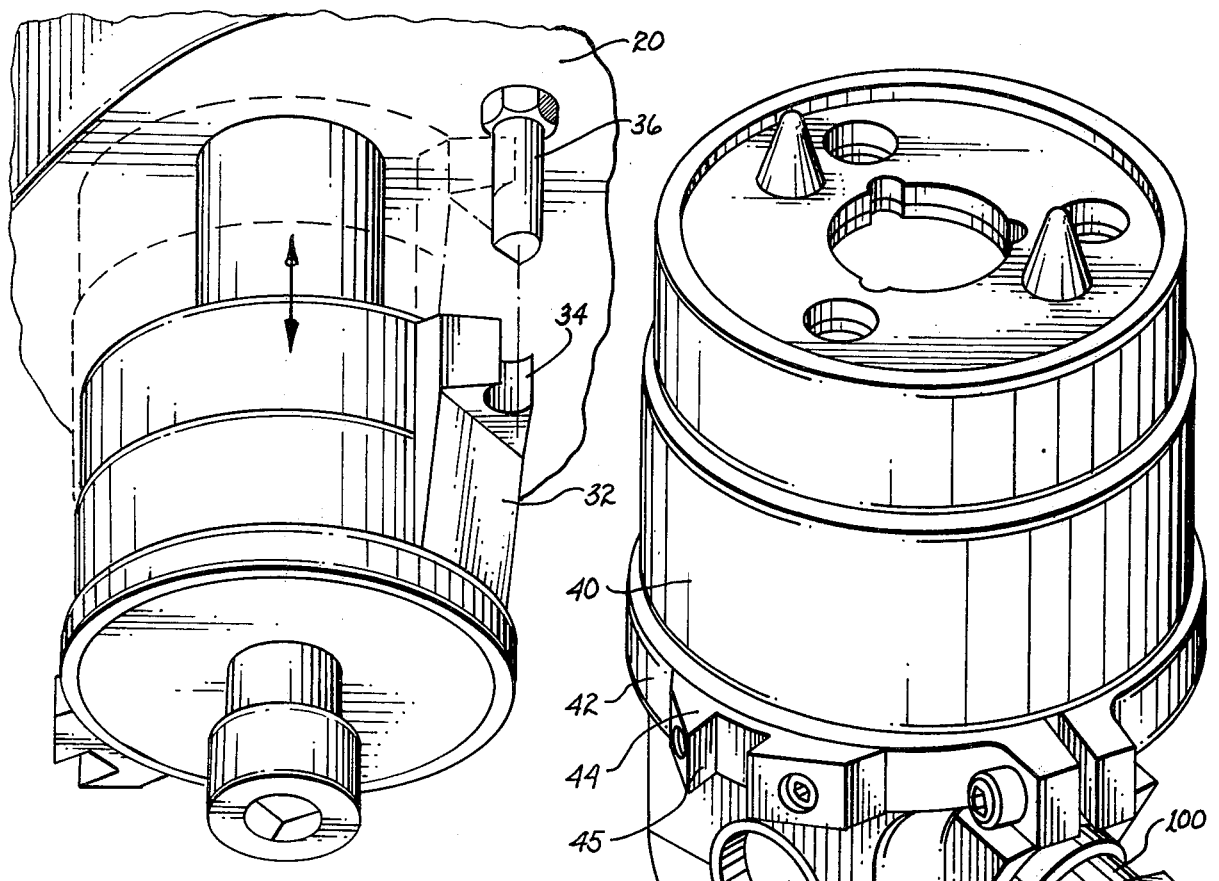
FIG.-2A
FIG.-2B
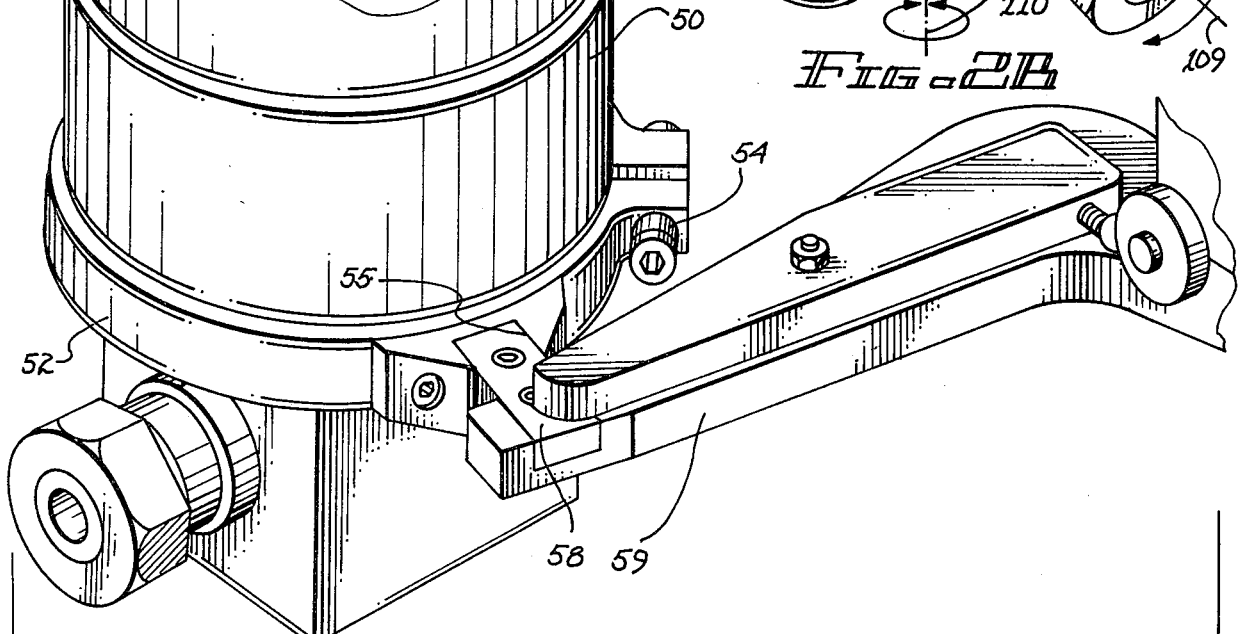
FIG.-3

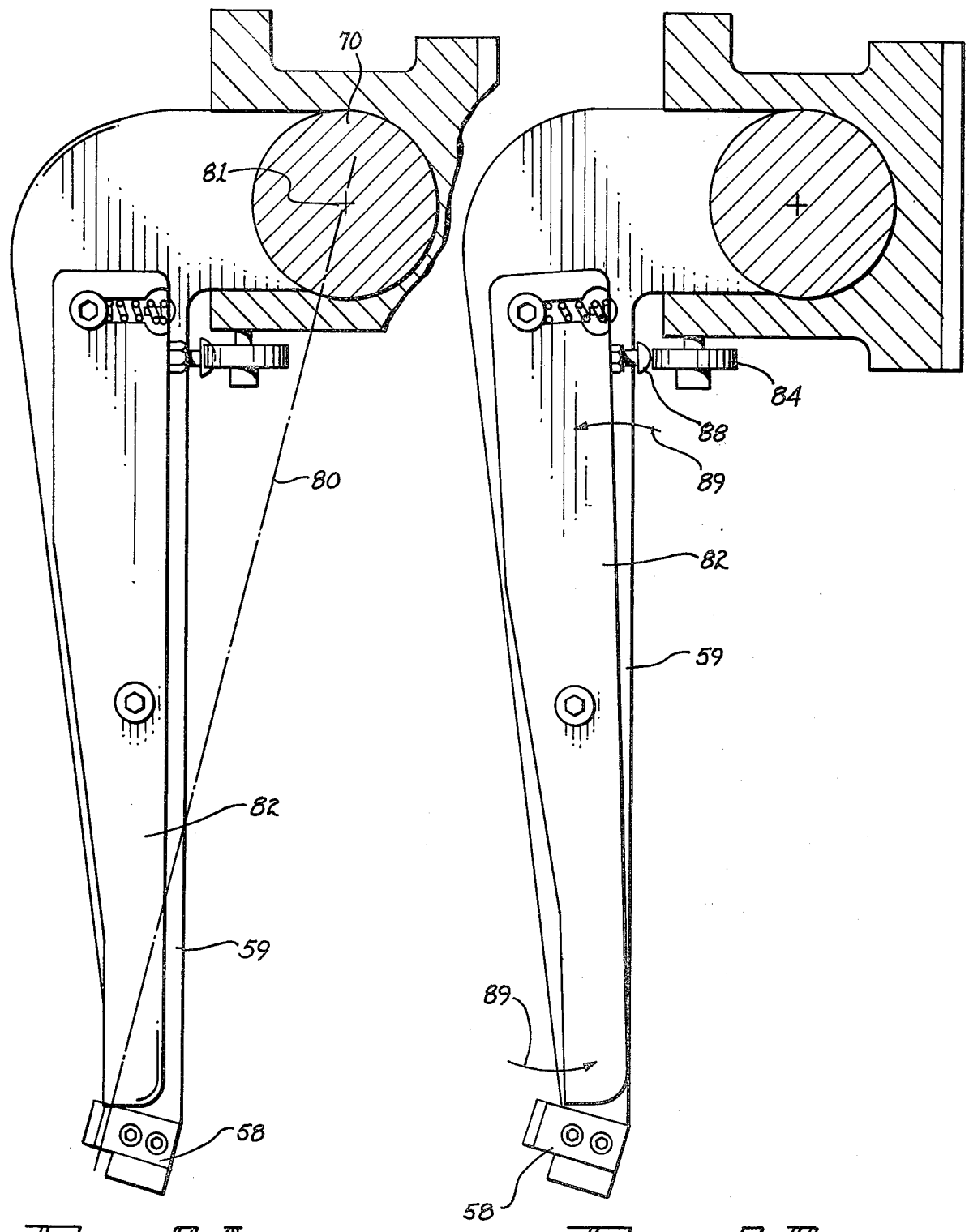

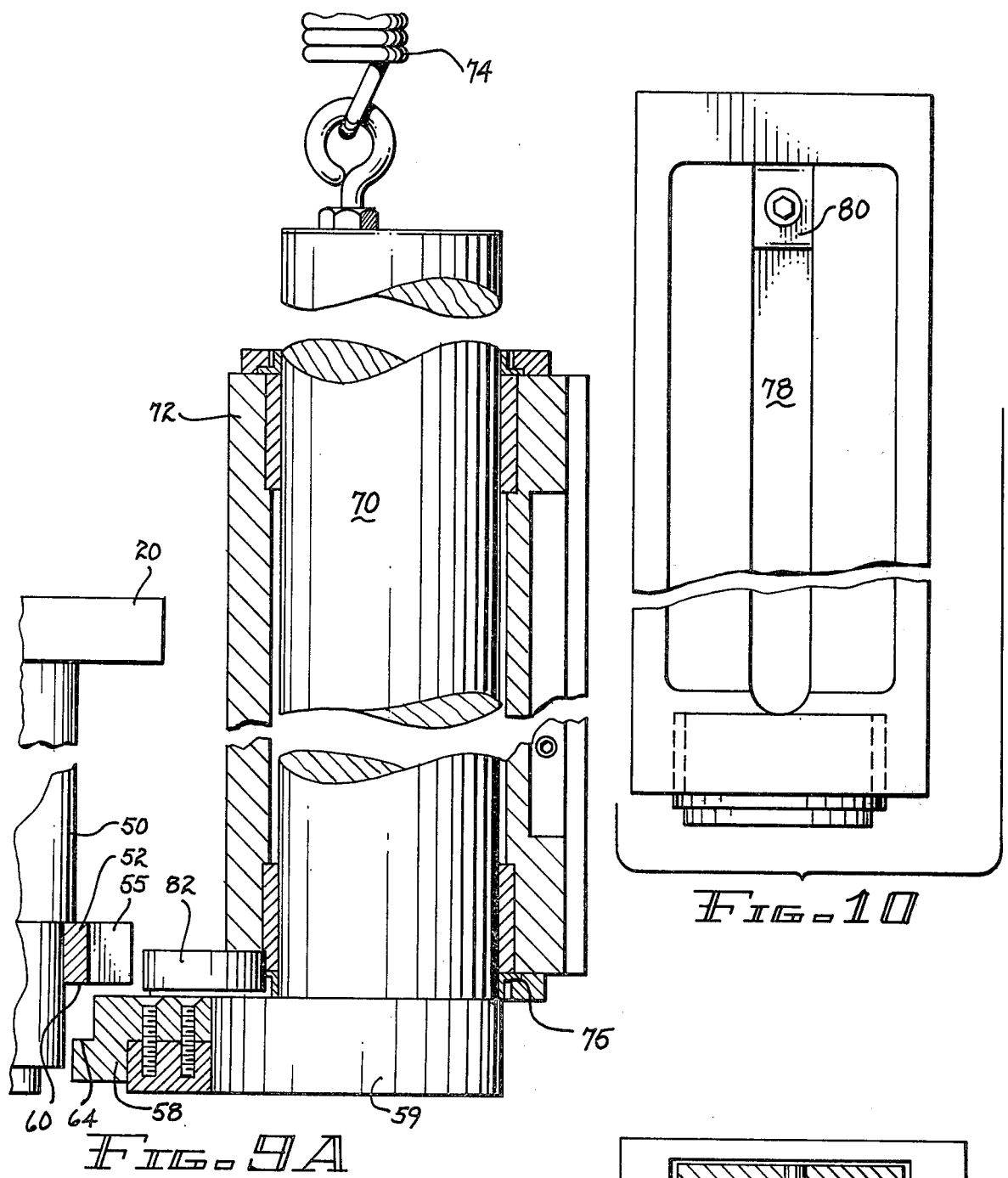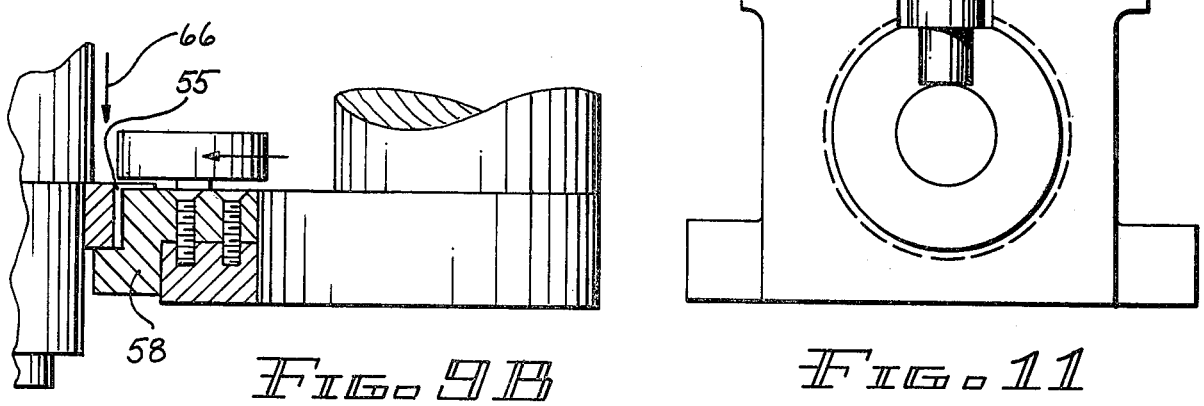

MACHINING CENTER

BACKGROUND OF THE INVENTION

Machining centers incorporating positioning devices such as turrets or carousels are well known in the art. Such positioning devices can take a variety of forms and the tool holders that are mounted on such devices can also assume different configurations. The efficiency afforded by the user of such positioning devices on machine centers is manifest in view of the ability of the machine to be programmed to perform numerous tasks using a variety of tools without the necessity of stopping the operation of the center to manually mount a specific tool on the spindle prior to each step in a machining operation. The individual tools can be mounted in tool holders in a variety of ways; further, the tool holders can be secured to the positioning means or carousel using a variety of techniques. One such tool holder configuration that may be used to hold tools on a carousel is shown in U.S. Pat. No. 3,999,769. In that patent, a tool holder is described that is mounted in a turret or carousel and is "locked" into position in the carousel until the tool that the holder is supporting is required for the machining operation. The carousel is then positioned beneath the spindle of the machine and the spindle is lowered into contact with the tool holder. The mechanism described in the above patent provides a means for the machine to automatically disengage the tool holder (and tool) from the turret or carousel and to attach the holder to the spindle where it may be driven thereby and lowered so that the tool may come into contact with a work piece. Upon conclusion of the operation, the spindle is withdrawn and the tool holder is automatically replaced in the carousel and disengaged from the spindle.

Other techniques may be used to engage the machining center spindle and to disengage the spindle to replace the tool holder in the turret or carousel. Other devices are available in the prior art that can be attached to a machine tool such that the driving member or spindle drives the tool being held in the tool holder at an angle with respect to the spindle or at a velocity different than that of the spindle. However, these prior art devices are usually manually attached to the machine center and are secured in such a fashion that the machine must be stopped and the device completely removed before further operations are undertaken.

SUMMARY OF THE INVENTION

The present invention contemplates the utilization of a machine tool commonly referred to as a machining center. Such apparatus incorporate three-dimensionally moving platforms for mounting work pieces thereto as well as driven spindles that rectilinearly move along their axis as well as rotate thereabout. The operation of the spindle, including its speed and rectilinear motion, and the operation of the table upon which the work piece is mounted are usually controlled through the utilization of a computer and usually referred to as numerical control. Such computers or controllers can be programmed to cause the machining center to perform a variety of operations in particular succession in a work piece. Such operations, however, require a variety of tools, including drills, taps, reamers, milling cutters, and the like. Therefore, even though the machining center is programmed to perform successive operations on a work piece, the tools utilized by the rotating spindle on the machining center must be changed. To provide efficiency, it is common to mount tools in tool holders which in turn are placed in a carousel turret or other positioning means. When a particular tool is called for by an operation, the tool holder holding that tool is positioned beneath the spindle of the machining center; subsequently, the spindle is lowered into contact with the tool holder and the tool holder, tool, and spindle are then lowered further so that the machining operation can be conducted on the work piece. In the improved machining center of the present invention, tool holders are provided that are divided into three sections. The first section may take the form of the tool holder shown and described in the above mentioned patent; that is, the first section of the tool holder operates to temporarily store the tool holder in a carousel and permit the spindle of the machining center to be lowered into contact therewith and cause the tool holder to disengage the carousel and to become secured to the spindle for rotation therewith. Further rectilinear motion of the spindle along its axis will then cause the tool being held by the tool holder to come into contact with the work piece to perform the necessary operation. The second section of the tool holder used in the machining center of the present invention incorporates an anti-rotation device. The device may take the form of a coupling having one portion thereof clamped to the tool holder and provided with a slot. The second portion of the anti-rotation device includes a key that dovetails into the slot and which is connected to an arm extending to a position wherein it is supported against rotation by the frame of the machining center. In the embodiment chosen for illustration, the arm is connected to a ram which in turn is supported by the frame of the machining center. The ram, and thus the arm and key, is movable rectilinearly in a direction parallel to the rotational axis of the spindle. In this manner, the arm, and key, can remain in contact with and in dovetailed relation to the slot formed in the first portion of the anti-rotation device mounted on the second section of the tool holder.

The tool holders incorporated in the machining center of the present invention also include a third section provided with means for attachment to a tool. The attachment may take any of the conventional forms such as a collet or a set screw. A driving means such as a series of gears is provided for interconnection between the first and third sections of the tool holder. In this manner, rotational force of the rotating spindle is transmitted to the tools through the driving means and to the third section of the tool holder. The driving means may take a variety of forms and provide numerous functions that have heretofore been unavailable in machining centers having tool holders that are stored on a positioning device such as a carousel or turret.

Accordingly, it is therefore an object of the present invention to provide an improved machining center wherein a plurality of tool holders may be stored in a positioning device and wherein the machining center incorporates an anti-rotation device for use with the tool holders.

It is another object of the present invention to provide an improved machining center incorporating tool holders that may be used to drive tools about a rotational axis other than the axis of the driving spindle.

It is another object of the present invention to provide an improved machining center incorporating tool holders that permit the utilization of tools driven at a rotational velocity in excess of the rotational velocity of the driving spindle.

It is still another object of the present invention to provide an improved machining center utilizing tool holders wherein a plurality of tools may be driven through a single driving spindle to thereby permit multiple operations to take place simultaneously.

These and other objects of the present invention will become apparent to those skilled in the art as the description thereof proceeds.

BRIEF DESCRIPTION OF THE DRAWINGS

FIG. 2A is an isometric view of a tool holder of the type utilized in the present invention showing a feature of the holder as it is mounted on the carousel of the machining center of the present invention.

FIG. 2B is a perspective view of a tool holder constructed in accordance with the teachings of the present invention showing a portion of the anti-rotation device used in the present invention.

FIG. 3 is a perspective view of the second portion of the anti-rotation device used in the invention showing the arm and key secured thereto engaging the slot of the anti-rotation device secured to a tool holder.

FIGS. 8A and 8B are top views of portions of the anti-rotation device incorporated in the present invention.

FIG. 9A is an elevational view, partly in section, of a ram secured to an arm useful in describing the operation of the anti-rotation device incorporated in the present invention.

FIG. 9B is a portion of FIG. 9A shown moved into an anti-rotation position.

FIG. 10 is a side elevational view of the housing for the ram of FIG. 9A with the ram removed.

FIG. 11 is a top view of a ram and housing useful in the description of the present invention.

DETAILED DESCRIPTION OF THE INVENTION

Figure 1:
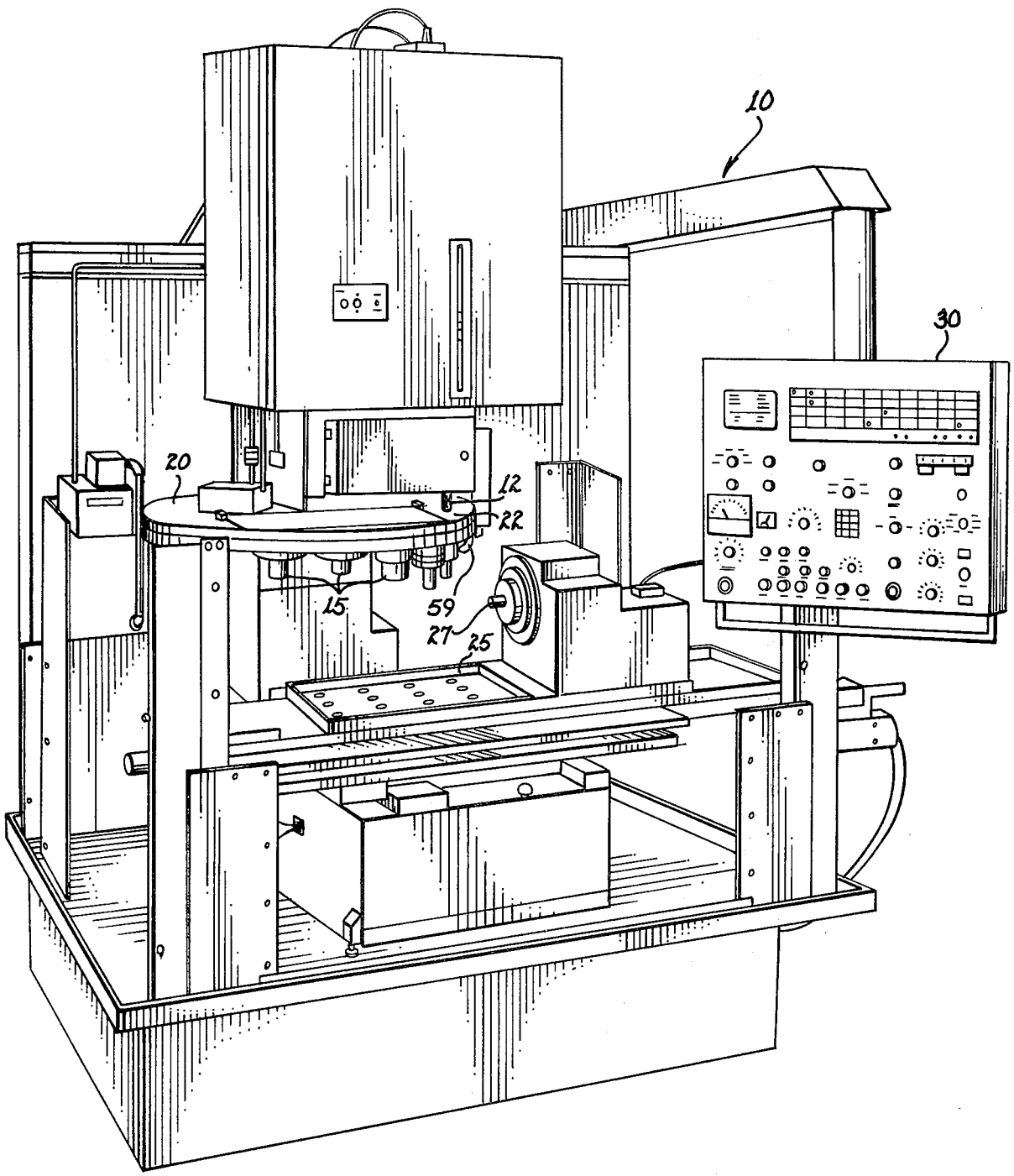
FIG. 1 is a perspective view of a machining center incorporating the teachings of the present invention.

Referring to FIG. 1, a machining center 10 is shown incorporating the teachings of the present invention. The machining center includes a conventional head 11 and a rotatable spindle 12 that is movable rectilinearly along its axis. A plurality of tool holders shown generally at 15 are secured to a positioning device such as a turret or carousel 20. The tool holders, to be described more fully hereinafter, are secured to the carousel 20 and may be positioned at a work station indicated generally at 22 by rotation of the carousel to bring the desired tool holder into axial alignment with the spindle 12. It may be noted that other techniques may be used to temporarily store and subsequently align tool holders with the spindle; for example, in the event a large number of tool holders are to be stored on the positioning device, a conveyer may be utilized in place of the carousel and may extend beyond the bounds of the carousel as shown in FIG. 1. When the desired tool holder, and thus tool, is positioned at the work station 22, the spindle 12 may be lowered and the tool holder secured thereto.

The machining center may include a movable work supporting table 25 and may also include a work rotating spindle 27 for rotating the work prior to successive operations. The table 25 and spindle 27 may each be moved along any or all of three axes. The rotational velocity of the spindle 12, as well as its rectilinear motion including its velocity and position, is controlled by a computer or numerical controller shown schematically at 30. The positioning of the work piece in any of the three axes, as well as the rotation of the work piece through the utilization of the spindle 27 is also controlled by the controller 30. Such controllers are well known in the art and may be used to program the machining center to select a tool, the rotational velocity for the tool, the movement of the tool, the movement of the workpiece, the selection of the next tool for the succeeding operation, and the specific positioning of the work piece between operations; such computer numerical controlls as the GE Control Model 1050HM and the computer numerical control manufactured by Fanuk Model. No. 6MB provide control functions in a manner acceptable for use in the present invention.

Referring now to FIG. 2A, a tool holder 15 is shown secured to the carousel 20 in a manner similar to that of FIG. 1. The tool holder includes an attachment 32 secured to the side thereof incorporating a channel 34 designed to accept and closely mate with a short shaft 36 fastened to the bottom side of the carousel 20. It may be seen that when the tool holder 15 is in position and in contact with and supported by the carousel 20, the pin or shaft 36 prevents the tool holder from rotating about its axis. In this manner, a specific rotational position may be maintained by the tool holder during its temporary storate on the carousel. It may also be seen by reference to FIG. 2A that when the tool holder 15 is moved downwardly away from the carousel 20, as indicated by the arrow 38, the channel 34 becomes disengaged with the pin 36, thus permitting the tool holder to rotate; however, an anti-rotation device (to be described more fully hereinafter) prevents the tool holder from rotating when the tool holder disengages the pin 36.

Referring to FIG. 2B, a tool holder 40 is shown that includes a portion of an anti-rotation device in the form of a circumferential clamp 42 having an attachment thereon 44 forming a slot 45. It may be seen that the clamp 42 may be moved relative to the tool holder 40 by loosening the clamp at the machine screw 48 and positioning the clamp such that the slot 45 is oriented in a predetermined manner. The utilization of the clamp 42 and slot 45 may be described in connection with FIG. 3.

Referring to FIG. 3, another tool holder 50 is shown having a circumferential clamp 52 thereon and including a slot 55. The clamp 52 and the slot 55, being secured to the tool holder 50, prevent the rotation of the tool holder through the cooperation of a key 58 mounted on an arm 59 that extends away from the tool holder 50 and is connected to the frame (not shown in FIG. 3) of the machining center. When the arm 59, and key 58, are positioned as shown in FIG. 3 with the key in engagement with the slot 55, it may be seen that the tool holder 50 is prevented from rotating about its axis. Further, it may also be seen that the angular positioning of the tool holder 50 about a vertical axis (as shown in FIG. 3) may be adjusted or predetermined by loosening the set screw 54, rotating the tool holder 50 to the desired angular position, and retightening the set screw 54 thus firmly "clamping" the clamp 52 to the tool holder 50.

It may therefore be seen that the clamp 52 and slot 55 of FIG. 3 form a first "portion" of an anti-rotation device, the second portion of which comprises the key 58 (that dovetails into the slot 55) and arm 59 (the latter being secured against rotation by connection to the machining center frame.

Referring now to FIGS. 8A and 8B, and FIGS. 9A and 9B, the operation of the anti-rotation device may more readily be seen. The arm 59 with the key 58 secured thereto is positioned relative to the carousel (as shown in FIG. 1) such that the key 58 is in alignment with the slot 55 provided in the band 59 attached to the tool holder 50. It may be seen by reference to FIG. 9A, that as the carousel 20 rotates, the slots, such as slot 55 on the tool holders, such as the tool holder 50, pass over the key 58 and do not interfere therewith. However, when the tool holder 50 is stopped in the proper position to be in the work station 22, the slot 55 is aligned with the key 58. When the tool holder is lowered out of contact with the carousel 20, the slot 55 engages the key 58 as shown in FIG. 9B. It may be noted that as the slot 55 lowers onto the key 58, a shoulder 60 on the bottom of the band 52 comes into engagement with a corresponding shoulder 64 provided on the key 58. Further downward movement of the tool holder 50 as indicated by the arrow 66 in FIG. 9B, will thus result in the downward motion of the arm 59. In turn, the arm 59 is secured to a ram 70 which may be journalled in a housing generally shown at 72 which permits the ram to move rectilinearly parallel to motion of the tool holder 50. It may be noted, however, that the ram is urged upwardly by a biasing means such as a spring 74 attached to the top thereof. Thus, the ram, and spring, continuously provide an upward force on the key 58 and butting shoulders 60 and 64 during the time that the key is engaged into the slot 55 of the tool holder 50. When the operation of the tool holder is complete, and the tool holder, and its attached tool, is to be returned to the carousel 20, the upward motion t of the driving spindle of the machining center will cause the tool holder also to move upwardly; since the key 58 is biased upwardly by the spring 74, the key will follow the tool holder until it reaches a position wherein the ram 70, and thus the arm 59, are restrained from further upward motion by a stop such as that shown in FIG. 9A at 75. It may be seen by reference to FIGS. 10 and 11 that the ram 70 is prevented from rotation through the utilization of a keyway or slot 78 provided for a follower 80 that may be attached to the ram 70. Thus, the ram is incapable of rotating and is permitted only rectilinear motion along its axis.

As seen in FIG. 8A, it is important to note that the force exerted by any attempted rotation of the tool holder exerted on the key 58 is transmitted along a line of force 80 passing directly through the axis 81 of the ram 70. The positioning of the portions of the anti-rotation device including the slot 55, key 58, arm 59, and ram axis 81 becomes important in order to assure that the key remains engaged in the slot and that no forces, that may result from the machining operation, attempt to dislodge the key from the slot and thus interrupt the anti-rotational requirements of a section of the tool holder. For example, if the direction of the force, as indicated at 80 in FIG. 8A, did not pass through the axis 81, but rather passed to the right of the axis (as viewed in FIG. 8A), a force would be exerted on the key that would tend to urge the key into the slot 55 and would thus increase the friction to the extent that undue wear would result and removal of the key from the slot when the tool holder moves upwardly would experience drag at the contact with the key. If the line of force such as that shown at 80 in FIG. 8A were to pass to the left of the axis 81 of the ram 70, the key would exhibit a tendency to pop out of the slot 55 under load. it may thus be seen that it is important for the line of force being exerted on the key 58 by the anti-rotation device slot 55 to pass through the axis 81 of the ram 70.

When the tool holder is lowered such that the tool being held thereby is performing an operation upon a work piece, it is desirable to lock the key 58 into the slot 59 to prevent separation in the event of vibration or shock loading. To this end, a plate 82 is pivotally mounted to the top of arm 59 and may be positioned as shown in FIG. 8A and FIG. 9B to extend over the top of the slot 55 and thus prevent disengagement of the key 58 and the slot 55. When the tool holder is to be withdrawn upwardly at the end of an operation, the biasing spring 74 will attempt to withdraw the key 58 and keep into contact with slot 55; however, to prevent inadvertent disengagement, the plate 82 prevents the withdrawal of the slot from engagement with the key 58. When the tool holder has been returned to the carousel 20, the plate 82 may be rotated, such as by operation of cam 84 and cam follower 88 to pivot the plate in a direction shown by the arrows 89 in FIG. 8B to a position such as that shown in FIG. 9A. In the latter position, the plate is out of the way so that the clamp 52 and slot 55 may be withdrawn from the key 58.

Figure 4:
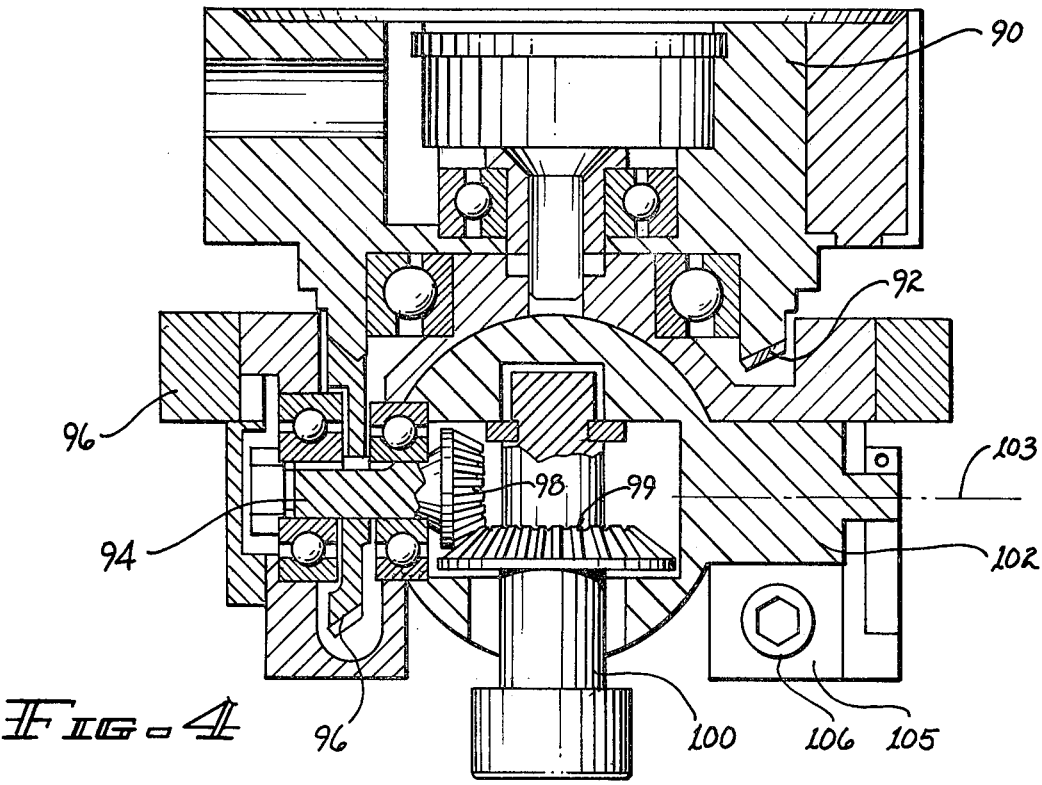
FIG. 4 is a cross-sectional view of one embodiment of a tool holder constructed in accordance with the teachings of the present invention.

Referring to FIG. 4, a cross-section of a tool holder constructed in accordance with the teachings of the present invention is shown. The upper portion or first section 90 is in the form shown in the above mentioned U.S. Pat. No. 3,999,769. The description in the above mentioned patent includes the details of the engagement of the tool holder with a carousel and the disengagement of the tool holder from the carousel and subsequent engagement with the spindle of the machining center. It is therefore felt unnecessary to describe the details of the mechanism for attaching the tool holder of FIG. 4, and subsequent figures, to the carousel and alternatively to the rotating spindle of the machining center. In the embodiment shown in FIG. 4, the first portion 90 (the portion corresponding to the tool holder of the above identified patent) incorporates a beveled ring gear 92 which therefore rotates with the spindle of the machining center. A drive shaft 94 is mounted in the second section of the tool holder, the second section including a circumferential clamp 96, similar to that shown at 42 in FIG. 2B or 52 in FIG. 3. Thus, section two (including the shaft 94 secured through bearings thereto) is not rotated above the axis of the machine tool spindle. A beveled drive gear 96 is keyed to the shaft 94 and engages the ring gear 92 to provide a driving force for a pair of bevel gears 98 and 99, the second of which is connected to and drives a third portion or tool spindle 100 of the tool holder. Thus, when the second portion of the tool holder is held against rotaion through the utilization of the clamp 96, rotation of the ring gear 82 results in the rotation of the bevel gears 96, 98 and 99 and therefore the rotation of the third section or tool spindle 100. The tool spindle 100 and the bevel gear 99 are journalled in a swivel 102 which may be rotated about an axis 103 coincident with the axis of rotation of the shaft 94. This axis 103 is perpendicular to the axis of rotation of the machining center spindle. The particular angle through which the tool spindle 100 is to be rotated can be predetermined and set manually; a clamp 105 and clamping machine screw 106 may be used to tighten the swivel 102 in a particular angular relationship with regard to the axis of the machining center spindle. The result of the ability to set the angular relationship of the tool spindle 100 about the axis 103 combined with the ability to rotate the second section of the tool holder through the utilization of the clamp 105 provides a means whereby the tool may be driven at any desired angle with respect to the axis of rotation of the machine tool spindle. For example, reference may be had to FIG. 2B wherein it may be seen that the tool spindle 100 rotates about its axis 109 which is determined by first adjusting the angular relationship between the axis 109 and the axis 103 (FIG. 4) and then by positioning the anti-rotation device incorporating the slot 45 circumferentially about the axis 110 of the machine tool spindle.

The embodiment of the tool holder shown in FIG. 4, and in FIG. 2B, thus permits the operator to select a particular angular relationship between the axis of rotation of the spindle on the machine and the axis of rotation of the tool. This angular relationship is selected by adjusting the circumferential positioning of the slot to be used as an anti-rotational device and the angle that the tool rotational axis makes with an axis 103 perpendicular to the rotational axis of the machine tool spindle. Thus, a hole for example, may be drilled in a work piece by selecting a predetermined angular relationship of a drill mounted in the tool holder of FIG. 4; the drilling operation will require the utilization of the anti-rotational device in combination with the tool holder configuration of FIG. 4 and the ability of the machining center to move the work piece in the proper angular relationship along the three axes parallel to the rotational axes of the tool.

Figure 5:
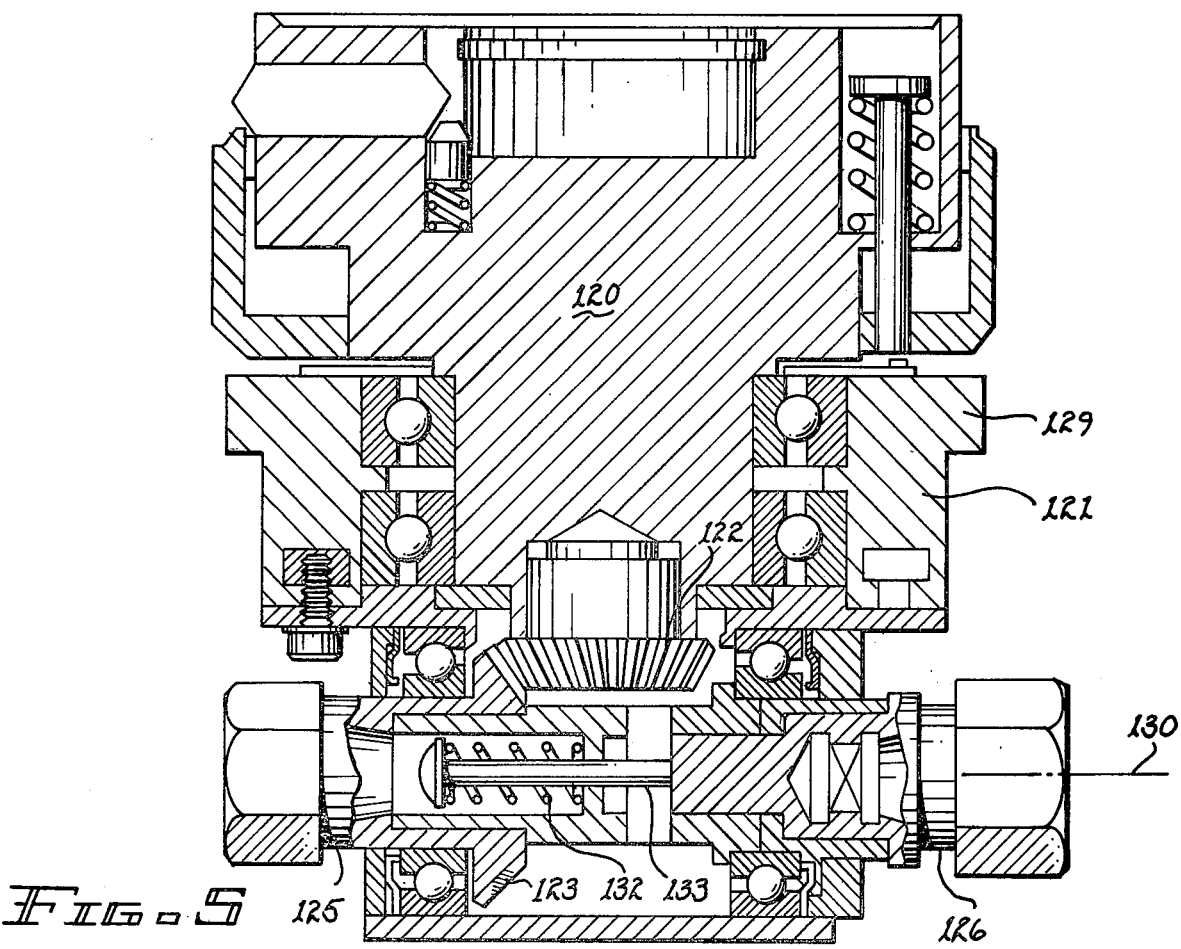
FIG. 5 is a cross-sectional view of another embodiment of a tool holder constructed in accordance with the teachings of the present invention.

Referring now to FIG. 5, another embodiment of a tool holder constructed in accordance with the teachings of the present invention is shown. Similar to the embodiment of FIG. 4, the first section or upper portion 120 conforms to the description given in the above identified United States patent. The first section 120 drives a bevel gear 122 that engages a second bevel 123 arranged at right angles to the first and keyed to drive both tool spindles 125 and 126. While the upper portion or first section 120 of the tool holder of FIG. 5 is rotated and driven by the machine tool spindle, the second section 121 is prevented from rotation through the utilization of an anti-rotation device, including a clamp 129 similar to the circumferential clamp 42 of FIG. 2B. Since the second portion 121 does not rotate, the rotation of the first portion 120, and the bevel gear 122, results in the rotation of the tool spindles 125 and 126 along an axis perpendicular to the axis of rotation of the driving spindle of the machining center.

It may be noted that the tool spindle 126, while driven by the bevel gear 123, is permitted limited rectilinear motion along its rotational axis 130. While limited rectilinear motion is permissible, the tool spindle 126 is nevertheless biased to the position shown in FIG. 5 through the utilization of a spring 132 mounted on a spring guide 133 connected to the tool spindle 126. In this manner, when a tap is secured to the spindle 126, the tap is free to follow the threads being formed thereby and to compensate for slight variations in the tapping procedure. The latter feature is important in view of the right angular relationship between the tap secured to the tool spindle 126 and the spindle driving the tap.

Figure 6:
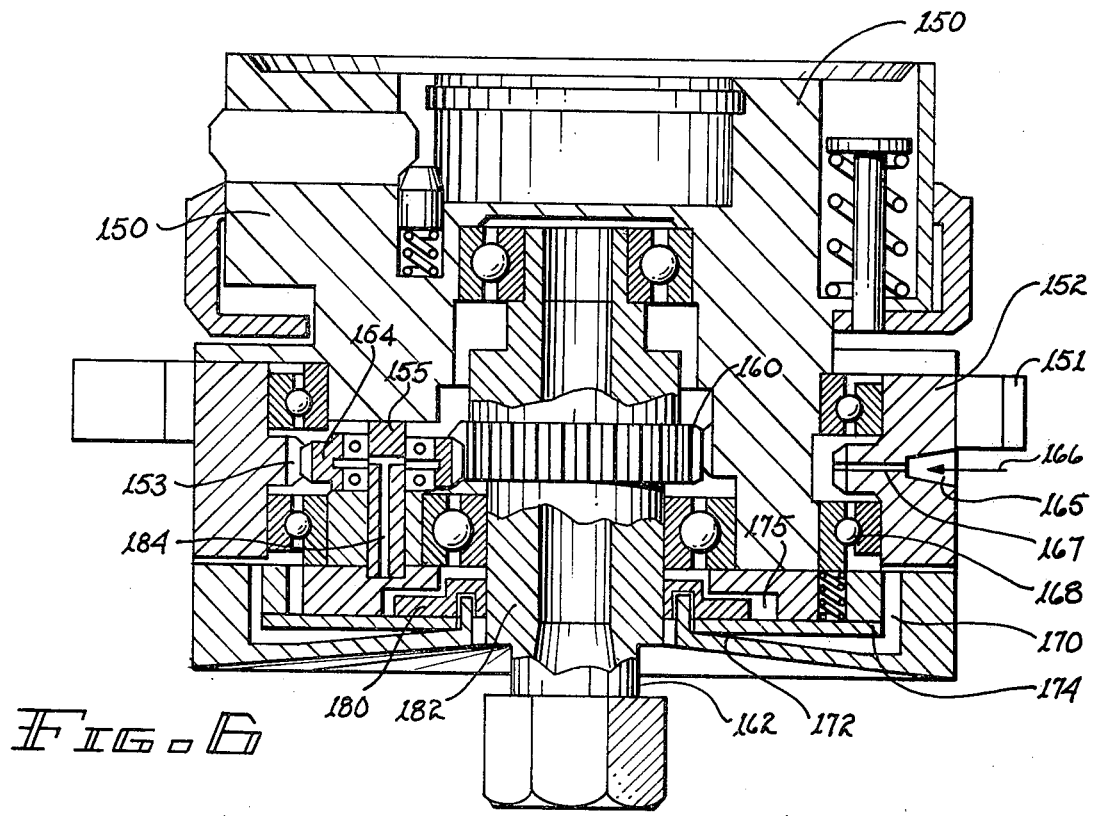
FIG. 6 is a cross-sectional view of another embodiment of a tool holder constructed in accordance with the teachings of the present invention.

Referring now to FIG. 6, another embodiment of a tool holder constructed in accordance with the teachings of the present is shown and wherein the tool spindle may be driven at a multiple of the rotational velocity of the driving spindle. Again, the upper portion 150 or first section of the tool holder of FIG. 6 is constructed in a manner corresponding to the teachings of the above identified patent. The second section is maintained in a non-rotational position through the utilization of a clamp 151 corresponding to the clamp 42 of FIG. 2B. The second portion includes a ring gear 153 which meshes with a plurality of planetary gears one of which is shown at 154. The planetary gear 154 is mounted for rotation about a shaft 155 secured to the first portion 150 of the tool holder of FIG. 6. It may therefore be seen that since the second section including the clamp 151 is maintained in a non-rotational posture, and the ring gear 153 also therefore maintained in a non-rotational posture, the rotation of the first portion 150 causes the planetary gear 154 to rotate about its shaft 155. A sun gear 160 also engages the planetary gear 154 and is thus driven at a velocity in excess of the rotational velocity of the first section 150. The sun gear 150 is secured to the third section or tool spindle 162. Thus, the tool holder of FIG. 6 provides a means, in combination with the anti-rotation device described previously, to drive a tool at an angular velocity in excess of the angular velocity of the spindle of the machining center. The particular angular velocity of the tool spindle will, of course, depend on the relative diameters of the planetary gears and sun gear. However, ratios of from 3 to 5 times the angular velocity of the tool spindle have been found to be easily achievable and operate satisfactorily.

A difficulty may be experienced in tool holders designed as shown in FIG. 6 wherein the rotational velocity of the planetary gears may be such that lubrication is demanding and the availability of lubricating oil to the bearings of the planetary gears becomes critical. The tool holder of FIG. 6 incorporates a lubricating technique that has been found to operate beneficially to lubricate the high rotational velocity of the bearings associated with the planetary gears. Since the second section 152 of the tool holder is maintained stationary (non-rotational) through the utilization of an anti-rotation device incorporating the clamp 151, an opening 165 may be provided to admit lubricating oil directed as shown by the arrow 166 against the side of the tool holder. In machining centers, lubricating and cooling oil is readily available and is frequently directed, by means of hydraulic pumps through conduits directly on work pieces to provide lubrication and cooling. It is contemplated with reference to the tool holder of FIG. 6 that a stream of such lubricating fluid will be directed against the opening 165 as indicated by the arrow 166. The lubricating fluid will thus flow through the passageway 167 provided in the second section 152 and find its way through the bearing indicated at 168 into a passageway 170 provided at the base of the tool holder. The passageway tapers upwardly and terminates at its narrow end 172 in a narrow passage permitting the oil to flow upwardly around a baffle 174 into a reservoir 175. A plurality of impellers 180 are secured to the shaft 182, the latter being driven by the sun gear 160 and thus being rotated at the velocity of the tool spindle 162, and extend into the reservoir 175.

The shaft 155 upon which the bearings and planetary gears 154 are mounted, incorporate cooling and lubricating oil passageways 184 therein; the shafts and passageways extend into the reservoir 175. It may be noted that the passageway 184 communicates with the chamber 175 at a position further from the axis of rotation of the tool spindle 162 than the area of communication between the narrow end of the passageway 172 and the chamber 175. Thus, the centrifugal force caused by the rotation of the impeller in the chamber 175 causes the lubricating oil to flow outwardly away from the axis of rotation of the tool spindle 162 upwardly through the passageway 185 and into the bearings of the planetary gear 154. In this manner, lubricating fluid is immediately admitted and forcedly directed into the bearings of the high velocity planetary gears, preventing fluid starvation, overheating and possible destruction of the bearings and failure of the tool holder.

Figure 7:
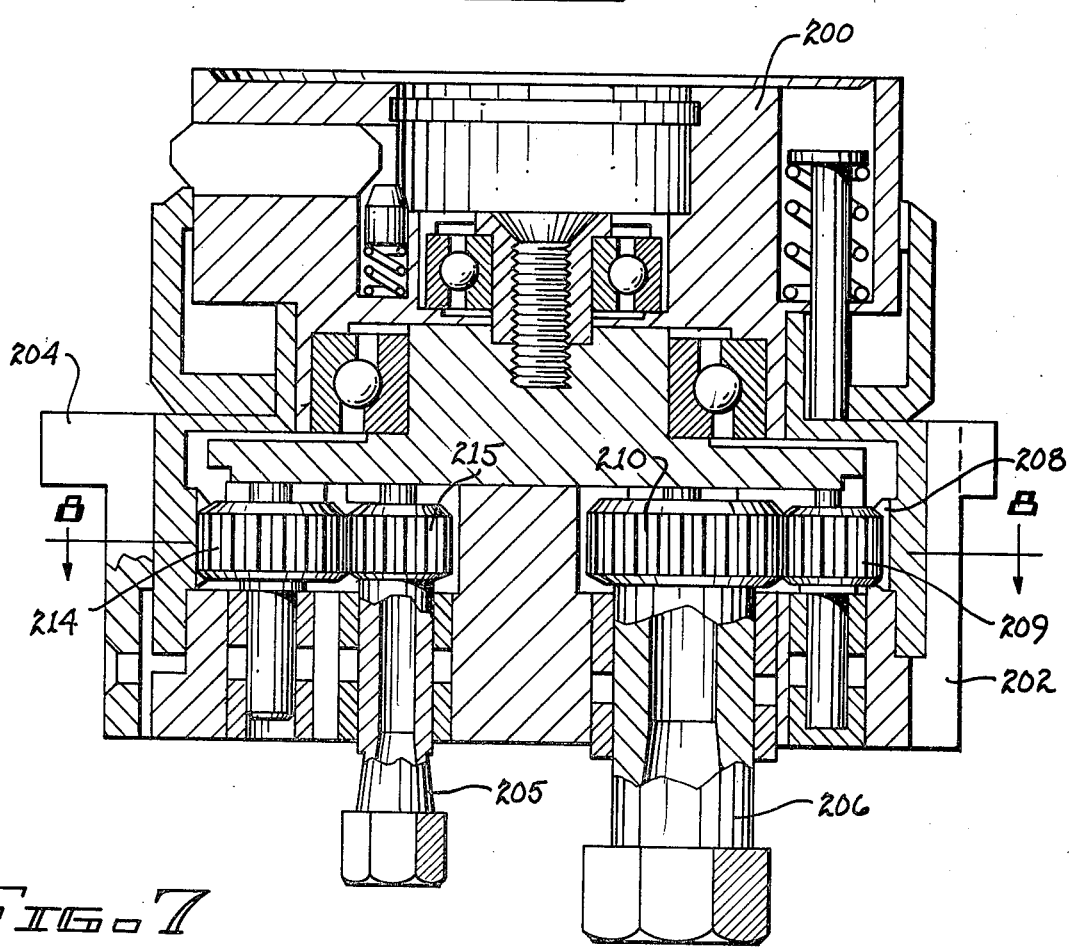
FIG. 7 is a cross-sectional view of another embodiment of a tool holder constructed in accordance with the teachings of the present invention.

Referring to FIG. 7, another embodiment of the tool holder constructed in accordance with the teachings of the present invention is shown. The embodiment in FIG. 7 represents a tool holder that may be utilized in the present invention to drive more than one tool and thus perform simultaneously several machining operations. Referring to FIG. 7, the upper portion or first section 200 of the tool holder is again constructed in accordance with the teachings of the above identified U.S. Pat. No. 3,999,769. The second section 202 remains non-rotational through the utilization of a clamp 204 similar to the clamp 42 shown in FIG. 2B. The third section or tool spindles 205 and 206 are driven simultaneously and at predetermined rotational velocities through the utilization of a gear train that will now be described. An internal gear ring 208 is provided and is driven through the rotation of the first section 200 of the tool holder. Thus, ring gear 208 turns at the rotational velocity of the machining center spindle. The stationary section 202 supports gear pairs 209—210 and 241—215 for rotation about vertical axes. One gear of each pair is in engagement with the rotating ring gear 208 and is thus driven thereby. The gear of each pair engaging the ring gear 208 drives its corresponding gear pair. Thus, gear 209 drives gear 210 and gear 214 drives gear 215. Gears 215 and 210 are connected to and drive tool spindles 205 and 206. It may be seen that the rotational velocity of the tool spindles 205 and 206 will depend upon the ratio of the diameters of the corresponding gear pairs. Thus, it may be seen that tool spindle 205 will rotate at a velocity greater than the rotational velocity of tool spindle 206. It will be obvious that multiple spindles could be driven wherein each of the spindles is rotated at the same velocity and the tool holder thus may be used to simply drill several holes, all of equal size, simultaneously. Alternatively, through the utilization of different size tool spindles and rotational velocities of tool spindles, a variety of machining operations may be accomplished simultaneously.

In operation, the machining center of the present invention will operate under a program that will select the operation to be performed on a work piece. The selection of an operation will determine the particular tool to be used during the operation and will thus predetermine the specific tool holder, holding the tool to be used, that will be selected. The tool holder will subsequently be positioned at the work station (in some instances the selection of the appropriate tool holder from the carousel or positioning means may be done manually, and the tool holder may be engaged with the machining center spindle manually). In the embodiments chosen for illustration, the tool holder is releasably secured to a carousel and is automatically disengaged from the carousel upon the lowering of the machine tool spindle into engagement with the tool holder. The tool holder automatically couples to the spindle and the spindle, tool, and tool holder may then be lowered into operating position relative to a work piece. While the tool holder is mounted on and in engagement with the carousel, the individual tool holders are prevented from rotating about their respective axes through the utilization of an anti-rotation pin secured to the bottom surface of the carousel and engaging an extension attached to the individual tool holders.

Each of the tool holders comprises a first section that engages the machining center spindle and is rotated thereby; a second section is provided for each tool holder that is restrained from rotation through the utilization of an anti-rotation device. The anti-rotation device may be in the form of a coupling comprising a clamp having a slot thereon secured to the tool holder which is aligned with a key mounted on an arm positioned adjacent the carousel. As the tool holder is lowered from the carousel, the key, previously aligned with the slot of the tool holder when the tool holder is at the work station, engages the slot and prevents the tool holder from rotating. As the tool holder and spindle continue downwardly toward the work piece, abutting shoulders between the clamp and key force the key to remain in the slot and follow the tool holder through the remainder of the operation. To ensure the continuous engagement of the key within the slot, a locking plate is pivoted over the slot to firmly lock the key in place and ensure that the key, and the arm secured thereto, follow the vertical motions of the tool holder.

When the operation is complete, and the machining center spindle is withdrawn upwardly, the locking plate is cammed out of its locking position and permits the tool holder to be withdrawn upwardly out of contact with the key; as the tool holder disengages the key, it is nevertheless retained in its specific angular position through the utilization of the anti-rotation pin positioned on the bottom of the carousel. Thus, the tool holder has been restored to its original position in the carousel, and the next operation, requiring a different tool and tool holder, may be positioned beneath the machining center spindle. The operation to be performed by the individual tool holders include those operations requiring more than one tool to be driven simultaneously, a tool having a rotational velocity in excess of the rotational velocity of the driving spindle, or an operation requiring a tool to be rotated about an axis at an angle to the axis of the driving spindle.

It may therefore be seen that the present invention provides a machining center having significant advantages and is substantially more efficient than those available in the prior art.

We claim:

1. In a machining center having: a frame; a spindle for driving tools, rotatable about an axis and movable rectilinearly along said axis for engaging tool holders to move said tool holders, and tools secured thereto, toward a work piece; the improvement comprising:

a. a positioning means for holding a plurality of tool holders and arranged to move a selected tool holder into a work station where the tool holder may be removed from the positioning means and attached to said spindle;

b. a tool holder, for attaching a tool thereto such as a drill or reamer, having an axis of rotation, removably secured to said positioning means and movable from a stored position on said positioning means to an operating position out of contact with said positioning means; said tool holder including a first section for attachment to said spindle for rotation therewith, a second section adapted to be restrained against rotation; and a third section for attachment to a tool for rotationally driving said tool; said tool holder including drive means interconnecting said first and third section for transmitting torque from said spindle to said tool;

c. an anti-rotation device comprising a disengageable coupling including a first portion secured to the second section of said tool holder and a second portion secured against rotation to said frame and movable along a rectilinear path parallel to the axis of rotation of said tool holder.

2. The combination set forth in claim 1 wherein said first portion includes means defining a slot and said second portion includes a key for engagement in said slot.

3. The combination set forth in claim 2 wherein said key is engaged in said slot as the tool holder is removed from said positioning device.

4. The combination set forth in claim 2 wherein said key is mounted on an arm, and is positioned in the path of the slot on said tool holder when said tool holder is positioned at said work station.

5. The combination set forth in claim 3 wherein said key is mounted on an arm, and is positioned in the path of the slot in said tool holder when said tool holder is positioned at said work station.

6. The combination set forth in claim 4 wherein said arm is secured, at an end thereof opposite said key, to an extendable ram movable along an axis parallel to the axis of said spindle.

7. The combination set forth in claim 6 wherein said ram is biased to move upward against the downward force exerted on said tool holder by said spindle.

8. The combination set forth in claim 7 wherein said key is positioned on said arm so that any force exerted on said key by the attempted rotation of said second section is directed along a line from said key to the axis of said ram.

9. The combination set forth in claim 4 including a locking plate, pivotally mounted on said arm, movable from an unlocked position to a locking position overlying said first portion to prevent disengagement of said key from said slot.

10. The combination set forth in claim 1 wherein said first portion is engaged in said second portion as the tool holder is removed from said positioning device.

11. The combination set forth in claim 1 wherein said first portion is mounted on an arm, and is positioned in the path of said second portion of said tool holder when said tool holder is positioned at said work station.

12. The combination set forth in claim 11 wherein said arm is secured, at an end thereof opposite said first portion, to an extendable ram movable along an axis parallel to the axis of said spindle.

13. The combination set forth in claim 12 wherein said first portion is positioned on said arm so that any force exerted on said first portion by the attempted rotation of a tool holder is directed along the line from said first portion to said ram axis.

14. The combination set forth in claims 1, 6, 8, 10, 11, 12 or 13 wherein said drive means comprises:

a. a ring gear secured to said first section for rotation therewith;

b. a drive shaft mounted in said second section for rotation about the shaft axis perpendicular to said spindle axis;

c. a drive gear secured to said shaft and engaging said ring gear;

d. a first bevel gear secured to said shaft, and a second bevel gear, engaging said first bevel gear, mounted in said third section;

e. said second section positionable by rotation about the axis of said shaft;

f. clamping means for securing said second section at a desired angular position after rotation about said shaft axis;

and wherein said coupling is adjustable to permit said second section to be rotated about the tool holder axis to a desired position and then clamped.

15. The combination set forth in claims 1, 6, 8, 10, 11, 12 or 13 wherein said drive means comprises:

a. a first bevel gear secured to said first secton for rotation therewith;

b. a second bevel gear, engaging said first bevel gear, mounted for rotation about an axis perpendicular to said spindle axis;

c. said third section secured to said second bevel gear for rotation therewith and including attachment means for holding a tap; said attachment means being driven by said second bevel gear but being free to move axially along the axis of rotation of said second bevel gear; and d. spring biasing means urging said attachment means and tap toward said spindle axis.

16. The combination set forth in claims 1, 6, 8, 10, 11, 12 or 13 wherein said drive means comprises:

a. a ring gear secured to said second section;

b. a plurality of planetary gears engaging said ring gear and secured to said first section for rotation therewith; and c. a sun gear, engaging said planetary gears, secured to said third section;

whereby the rotational velocity of the tool is greater than the rotational velocity of the spindle by a predetermined ratio.

17. The combination set forth in claims 1, 6, 8, 10, 11, 12 or 13 wherein said drive means comprises:

a. a ring gear secured to said section;

b. a plurality of planetary gears engaging said ring gear and secured to said first section for rotation therewith;

c. a plurality of tool driving gears, each engaging a different one of said planetary gears;

and wherein said third section comprises a plurality of tool holding spindles each driven by a different one of said tool driving gears, whereby said tool holder permits said spindle to drive multiple tool holding spindles and therefore simultaneously perform multiple operations on a work piece.

18. The combination set forth in claim 1 wherein said third section rotates faster than said spindle.

19. The combination set forth in claim 1 wherein said third section includes multiple tool spindles for simultaneously driving several tools.

20. The combination set forth in claim 1 wherein said third section includes an impeller for forcing lubricating oil into bearings mounted internally thereof.

21. The combination set forth in claim 1 wherein said third section includes a tool driving spindle that is positionable at any desired angle with respect to the axis of rotation of said spindle.

22. The combination set forth in claim 1 wherein said third section is positioned at a 90 degree angle with respect to the axis of rotation of said spindle.

23. The combination set forth in claim 22 wherein said tool driving spindle is movable along its axis and is spring biased toward the axis of rotation of said tool holder.

* * * * *